United States Patent
Macho et al.

(10) Patent No.: US 8,762,369 B2
(45) Date of Patent: Jun. 24, 2014

(54) OPTIMIZED DATA STREAM MANAGEMENT SYSTEM

(75) Inventors: David Manzano Macho, Madrid (ES); Miguel Angel Pallares Lopez, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/113,555

(22) PCT Filed: May 10, 2011

(86) PCT No.: PCT/EP2011/057492
§ 371 (c)(1),
(2), (4) Date: Oct. 23, 2013

(87) PCT Pub. No.: WO2012/152315
PCT Pub. Date: Nov. 15, 2012

(65) Prior Publication Data
US 2014/0052729 A1 Feb. 20, 2014

(51) Int. Cl.
*G06F 17/30* (2006.01)
(52) U.S. Cl.
CPC .... *G06F 17/30011* (2013.01); *G06F 17/30861* (2013.01); *G06F 17/30023* (2013.01)
USPC ............ 707/722; 707/769; 707/706; 707/770
(58) Field of Classification Search
CPC .................. G06F 17/30011; G06F 17/30861; G06F 17/30023
USPC ................................. 707/706, 722, 769–770
See application file for complete search history.

(56) References Cited

U.S. PATENT DOCUMENTS

| | | | |
|---|---|---|---|
| 7,483,907 B2 | 1/2009 | Ganguly et al. | |
| 7,904,444 B1 | 3/2011 | Koudas et al. | |
| 2005/0222882 A1* | 10/2005 | Aoki et al. | 705/7 |
| 2006/0004754 A1 | 1/2006 | Aggarwal et al. | |
| 2006/0288001 A1* | 12/2006 | Costa et al. | 707/5 |
| 2007/0067283 A1 | 3/2007 | Sengupta | |
| 2008/0189263 A1* | 8/2008 | Nagle | 707/5 |
| 2009/0204551 A1 | 8/2009 | Wang et al. | |
| 2011/0313986 A1* | 12/2011 | Ghosh et al. | 707/706 |
| 2012/0278298 A9* | 11/2012 | Ghosh et al. | 707/706 |

OTHER PUBLICATIONS

International Search Report dated Jan. 23, 2012 for International Application No. PCT/EP2011/057492, International Filing Date: Oct. 5, 2011 consisting of 4-pages.
International Preliminary Report on Patentability dated Sep. 3, 2013 for International Application No. PCT/EP2011/057492, International Filing Date: Oct. 5, 2011 consisting of 7-pages.

\* cited by examiner

*Primary Examiner* — Frantz Coby
(74) *Attorney, Agent, or Firm* — Christopher & Weisberg, P.A.

(57) ABSTRACT

A continuous query result estimator for use in a data stream management system. The data stream management system configured to execute a continuous query against data items received via at least one input data stream to generate at least one output data stream. The continuous query result estimator comprises a classification module configured to classify a set of at least one data item received via the at least one input data stream into one of a plurality of input data groups. A data store configured to store a respective rule for estimating a result of executing the continuous query against a data item belonging to the input data group. The continuous query result estimator also includes a result estimation module configured to select a rule from the rules stored in the data store on the basis of the classification performed by the classification module.

20 Claims, 11 Drawing Sheets

| Sensor identity | Temperature (°C) | Humidity (%) | CO level | Time |
|---|---|---|---|---|
|  |  |  |  |  |

OPTIMIZED DATA STREAM MANAGEMENT SYSTEM

TECHNICAL FIELD

The present invention generally relates to the field of data stream management systems (DSMS) and more specifically to techniques for reducing data stream processing latency in a DSMS.

BACKGROUND

Traditional relational database management systems (DBMSs) have been researched for over thirty years and are used for a wide range of applications. One of their key features is the storage of data as a collection of persistent "relations", often referred to as tables. A relation is defined as a set of tuples that have the same attributes, each tuple comprising an ordered set of one or more data elements. In a DBMS, a table (or relation) is organised into rows and columns. Each row of the table represents a tuple and each column represents an attribute common to all tuples (rows).

Another key feature of a DBMS is a set of well-defined operations (or "queries") that can be issued by any DBMS client in order to read, write, delete or modify the stored data. Structured Query Language (SQL) is the most widespread query language for this purpose, although it is often enriched with proprietary add-ons.

The conventional DBMS is also characterised by having highly optimised query processing and transaction management components, as illustrated in FIG. 1. A query from a DBMS client 1 is received by the DBMS 2, parsed by a query parsing unit 3 of the DSMS, and analysed in order to verify that it is both syntactically and semantically correct. Once this is done, a query plan is generated by the DBMS's query planner 4. A query plan is a set of step-by-step instructions defining how the query is to be executed, whose details depend on how the concrete DBMS is implemented. The query plan aims to optimise, for example, the number of accesses to the physical storage device 5 (e.g. a hard disk) in order to speed up the execution time. Transaction management secures the so-called "ACID" properties (i.e. "Atomicity, Consistency, Isolation and Durability").

Queries that are processed by a traditional DBMS are termed "ad hoc" queries. That is, the query is sent to the DBMS and the response to that query, which is both valid at that specific moment and complete, is sent back. Traditional (ad hoc) queries are typically specified in a particular format, optimised, and evaluated once over a "snapshot" of a database; in other words, over a static view of the data in the database. The stored data which is to be operated on during processing of the query must be stable, i.e. not subject to any other ongoing database transaction since, for example, a high ratio of write queries can harm the performance of the DBMS serving read queries.

However, in recent years, there has emerged another class of data intensive applications (such as those intended for sensor data processing, network management in telecommunications networks and stock trading) that need to process data at a very high input rate. Moreover, these applications need to process data that is typically received continuously over long periods of time in the form of a data stream. As a result, the amount of data to be processed can be unbounded. In principle, stream data could be processed by a traditional database management system, by loading incoming stream data into persistent relations and repeatedly executing the same ad hoc queries over these relations.

However, there are several problems with this approach. Firstly, the storage of stream data, indexing (as needed) and querying would add considerable delay (or latency) in response time, which may not be acceptable to many stream-based applications. At the core of this mismatch is the requirement that data needs to be persisted on a secondary storage device 5, such as a hard disk typically having a high storage capacity and high latency, before it can be accessed and processed by a DBMS 2 implemented in main memory, such as a RAM-based storage device having a lower latency but typically lower storage capacity.

In addition, the above-described "snapshot" approach to evaluating stream data may not always be appropriate since the changes in values over an interval can be important for stream processing applications, for example where the application needs to make a decision based on changes in a monitored temperature.

Furthermore, the inability to specify Quality of Service (QoS) requirements for processing a query (such as latency or response time) to a traditional DBMS makes its usage less acceptable for stream-based applications.

It will therefore be appreciated that the characteristics of the conventional DBMS (i.e. the passive role it plays, the need for standardised query formats and associated predefined query plans, stable data, etc.) make the DBMS unsuitable for serving applications that require the processing of huge amounts of data. An example is an application performing Complex Event Processing (CEP) over a stream of data arriving periodically or continuously, from one or a plurality of data sources (e.g. sensors emitting their measured values, servers sending real-time stock rates, etc.), whose number is unpredictable.

Hence, the techniques developed for DBMSs need to be re-examined to meet the requirements of applications that use stream data. This re-examination has given rise to a paradigm shift along with new approaches and extensions to current techniques for query modelling, optimization, and data processing in order to meet the requirements of an increasing number of stream-based applications. Systems that have been developed to process data streams to meet the needs of stream-based applications are widely known as data stream management systems (DSMSs).

FIG. 2 shows a DSMS 10 together with a DSMS client 20. Queries for DSMS 10 are also expressed in a standard language similar to SQL (e.g. Continuous Query Language (CQL) and its derivatives) and a query plan is also produced, by a query parsing/planning unit 6. However, the queries executed in a DSMS are termed "continuous queries" (CQs) and differ from their DBMS counterparts principally by being specified once (commonly via provisioning, e.g. via operation and maintenance interfaces) and then evaluated repeatedly against new data over a specified life span or as long as there is data in the input stream(s) 11.

More specifically, a continuous query can be regarded as a query plan which consists of detailed algorithms for implementing a (typically large) number of relational operators, such as "select", "project", "join" and other "aggregation" operators, which are interconnected in a network. These operators act on data elements as they arrive and cannot assume the data stream to be finite. Some operators, for example "select" and "project", can act on data in a stream in turn to produce an output continuously. On the other hand, other operators, such as "join" and "sort", naturally operate on complete data sets and will therefore produce no output until the data stream ends, thus acting as "blocking" operators; in order to output results continuously, such blocking operators need to be converted into non-blocking operators, and this is often achieved by employing the concept of a "window" to produce time-varying, finite relations out of a stream.

Thus, the query plan associated with a continuous query is usually a complex entity consisting of a large number of operators, each operator being associated with a memory queue (or buffer) for buffering tuples during bursty input periods (in order not to lose incoming or partially processed data), and often requiring resources (primarily main memory) to hold state information to perform window-based computations successfully. For example, the "symmetric hash join" operator requires hash tables for its two relations for the duration of the window.

Thus, continuous queries are essentially long-running queries that produce output continuously. The input data stream(s) 11 are received by an input adapter 12 and then passed to the continuous query processor 13. The result of executing the continuous queries is output via the output adapter 14 as an output data stream 15, possibly with differing rates and schema as compared to the corresponding input data stream(s). The data items in the input data streams) 11 can be regarded as "raw events" while those in the output streams 15, which generally convey more abstract information as a result of the CQ execution, can be regarded as "computed events".

Accordingly, a DSMS is not required to store in a permanent manner all the data from the input streams (although it might store some of the received data in certain cases, at least temporarily, for example whenever historical data is needed). Data is extracted and processed by a DSMS as it is received continuously from the incoming streams, and output streams are produced as a result of the execution of CQs in a substantially continuous manner. Thus, in contrast to the traditional DBMS, a DSMS assumes an active role as long as it does not need to receive a (explicit) read query from a database client for sending some data to the client based on the stream data the DSMS currently holds.

Incoming streams 11 to, and outgoing streams 15 from, the DSMS 10 can be regarded as an unbounded sequence of data items that are usually ordered either explicitly by a time-based reference such as a time stamp, or by the values of one or more data elements (e.g. the packet sequence identifier in an IF session). A data item of a data stream can be regarded as a tuple of a relation. In this context, tuples comprise a known sequence of fields and essentially correspond with application-specific information. Hereinafter, the terms "data item" and "tuple" are used interchangeably.

One example of tuples that can be received by a DSMS within incoming data streams is shown in FIG. 3. In this case, a sensor having a unique ID sends, in a continuous manner (e.g. every second), a measure of the temperature, humidity and CO level of its surroundings. This constitutes a stream of data. A large number of sensors (even hundreds of thousands) can feed a DSMS, which can produce one or more output data streams based on the received incoming data streams. For example, the CQ execution by a DSMS over incoming data streams comprising tuples as illustrated in FIG. 3 can produce an output data stream for a certain DSMS client application that contains the sensor identity, CO level and time information, only when the monitored temperature exceeds a certain threshold.

A typical DSMS deployment is illustrated in FIG. 4, where the DSMS receives data from one or more incoming data streams 11, executes a continuous query against the received data and sends at least some of the processing results to a plurality of DSMS clients 20-1 to 20-N. Each DSMS client applies its own application logic to process the received data stream, and triggers one or more actions when the processing results satisfy predetermined criteria (e.g. the values reported by one or more sensors depart from certain pre-determined ranges, or an average value of a monitored variable exceeds a threshold). An action can comprise sending a message to another application server. For example, the DSMS client may issue an instruction for sending an SMS or activating an alarm, or a message towards a certain device to change an operational parameter of the device. The actions taken by the client applications 20-1 to 20-N may have to fulfil strict requirements in terms of latency after a combination of input events.

In almost all practical applications the characteristics of the input streams are unpredictable. According to configured QoS settings, the DSMS deployment shown in FIG. 4 might produce output events even in the case of incomplete or out-of-order sequences of input events, or in cases where the rate of events generated by different inputs 11 is very diverse.

The bursty nature of the incoming stream(s) can prevent DSMSs from producing correlated outputs when the bursts of different inputs are not synchronised. Even in the case of a single input, this can produce a sparse stream. For example, a temperature sensor might store locally a number of temperature readings for transmission in order to save battery power, instead of producing a periodic sequence of data items. High-volume, high-speed data streams may overwhelm the capabilities of the stream processing system.

This circumstance will force a DSMS to wait for the arrival of input data items to process in order to be able to produce an output. This, in turn, might prevent the DSMS from satisfying certain QoS requirements. In the example of the temperature sensor provided above, an application expecting to trigger an alarm when a temperature reading is above a given threshold might produce an outdated alarm, depending on the period at which the temperature sensor sends sets of temperature readings.

Two key parameters for processing continuous, potentially unbounded data streams are: (i) the amount of memory available; and (ii) the processing time required by the query processor, as will now be explained.

(i) Memory is a precious resource and constitutes an important design constraint. As noted above, a DSMS uses the concept of a "window", which is essentially a time-based or tuple-based buffer in which incoming data items are stored until all the data required have become available. In some cases the defined windows are not wide enough to collect all the information required to build the tuples. In reality, the probability of collecting complete tuples decreases with the number of input streams and the degree to which the frequencies of the data items in the different streams diverge. This may lead to an inability to collect enough information to perform the data analysis, and a consequent potential compromise of the results.

(ii) Response time (in other words, the latency introduced by processing incoming data streams and producing the results after executing the corresponding query) is another crucial characteristic that a DSMS tends to manage more effectively than competing technologies (e.g. in-memory databases). When the available resources are limited and time is critical, minimizing the response time is a must.

In many real-world streams, corrections or updates to previously processed data are available only after the fact. Stream sources (such as sensors, a web server, etc.) as well as the communication infrastructure connecting them to the DSMS can be highly volatile and unpredictable. As a result, data may arrive late or out of time, or even go missing during its transmission. In all these cases, applications would need to deal with incomplete input data, and may produce imperfect results unless an alternative mechanism is available.

In some scenarios, for example those involving databases which serve telecommunication networks where the various data streams have a range of data arrival rates, the performance of current data stream analysis systems is unsatisfactory. Waiting for all data to become available introduces some latency into the CQ execution process. For some applications, such as those where response time is more important than high accuracy, a delay in generating the CQ result can be impractical and even risky.

A possible solution to address this problem is to use so-called "sketches" associated with each input data stream. An example of this approach is provided in U.S. Pat. No. 7,483,907 B2. According to this approach, when a data stream is arriving late, a sketch summarising the data stream is used instead. These sketches approximate the underlying streams with reasonable accuracy. Another possible method is to generate histograms that describe the distribution of each data stream.

An example of a DSMS which handles input streams having disparate data arrival rates with the use of sketches will now be described with reference to FIG. 5.

FIG. 5 shows a deployment of a DSMS for controlling the temperature of a computer room so as to avoid an overheating of IT equipment therein and reduce the risk of a fatal fire. In this example, the DSMS 10 receives data from input data streams 11-1, 11-2 and 11-3 via input adapter 12, and generates and outputs two output data streams, 15-1 and 15-2, via output adapter 14 by executing continuous queries CQ1 and CQ2 over the input data streams. The output data streams 15-1 and 15-2 are provided to applications App1 and App2 on an application server or a user terminal 20. In the present example, the output data streams 15-1 and 15-2 may be used by the DSMS client 20 to indicate an emergency situation (e.g. by sending an SMS to a mobile terminal, or activating a bell within a room) and/or to generate commands for operating a cooling device.

The DSMS deployment of the present example comprises a DSMS 10 and three sensors that are provided at appropriate locations inside the room, namely sensor 1, sensor 2 and sensor 3. The DSMS 10 monitors parameters concerning the atmospheric conditions within the room, as received via the input data streams 11-1 to 11-3. In particular, two of the sensors, namely sensor 1 and sensor 2, monitor the temperature inside the room and generate respective data streams comprising the temperature readings, i.e. streams 11-1 and 11-2, respectively. The remaining sensor, sensor 3, records the ambient humidity (expressed as a percentage) and provides the humidity readings to the DSMS via data stream 11-3. The sensors are connected by any suitable means to the DBMS and thus send their respective data streams continuously to the DBMS 10.

The DSMS processes the received information and generates two output data streams. In particular, the DSMS 10 checks whether or not the measured temperature within the room exceeds a certain limit and, if so, generates an output data stream, 15-1, that causes an air conditioning system within the room to be activated (or its thermostat setting to be reduced). However, if the temperature is much higher than the limit, the DSMS client 20 performs the same action and additionally raises an alarm alerting the user or another application to the possibility of a fire in the room being monitored. Another possible action is to increase the speed of the fan responsible for circulating fresh air into the room.

Although the DSMS deployment of the present example involves three input data streams, a typical DSMS will have to execute continuous queries using data items received simultaneously via a substantially higher number of input data streams, and output more than two data streams.

As noted above, the illustrated DBMS analyses the incoming data streams 11-1 to 11-3 by executing continuous queries CQ1 and CQ2 against them. In the present example, the continuous queries are expressed in pseudocode (using no particular formalism) as follows:

CQ1: If $\text{Avg}(T_{sensor\_1}, T_{sensor\_2}) > 26°$ AND $H_{sensor\_3} < 80\%$ Then Activate Cooling CQ2: If $\text{Avg}(T_{sensor\_1}, T_{sensor\_2}) > 28°$ AND $H_{sensor\_3} < 30\%$ Then Raise Alarm Thus, continuous query CQ1 requires that whenever the average of the temperatures $T_{sensor\_1}$ and $T_{sensor\_2}$ recorded by the two temperature sensors is greater than 26°, and the humidity $H_{sensor\_3}$ inside the room (as recorded by sensor 3) is lower than 80%, a data stream is to be generated for causing the DSMS client 20 to switch ON the cooling system until the average temperature decreases to below 26°.

Continuous query CQ2 requires that whenever the average temperature recorded by the two temperature sensors (i.e. sensor 1 and sensor 2) is higher than 28° and the humidity level measured by sensor 3, i.e. $H_{sensor\_3}$, is lower than 30%, the DSMS 10 is to generate a data stream which causes the DSMS client 20 to alert a user of a possible fire in the room being monitored.

However, a problem arises when, for example, stream 11-3 provides its data at a lower data rate than streams 11-1 and 11-2. In this case, continuous queries CQ1 and CQ2 cannot be executed before the humidity level readings have become available to the DSMS 10.

Sketching techniques summarise all the tuples as a small number of random variables. Thus, they project the value of an input stream using, for example, random functions. A suitable sketch for this example (considering that the sketch predicts the value of stream 11-3 with a certain level of accuracy) would be the average of the previously seen five values of that stream. It is noted that the selection of five values is only an example, and a more accurate approach would estimate a function using statistical techniques.

Nevertheless, using sketching techniques to generate estimated values of missing data elements in input data streams does not preclude executing the corresponding continuous query/queries afterwards, which entails a substantial amount of data processing by the DSMS.

A further problem is that histograms and random sampling are useful for performing data summarization and selectivity estimation for only one input stream or parameter. For instance, in the example of FIG. 5, the estimated value for a missing data element from the stream 11-3 can be provided by considering an average of previously seen values. However, considering that data stream applications typically monitor multiple input streams and aggregations at the same time, this approach would require using many different types of sketches (one for each stream), and therefore introduces a large overhead. Furthermore, the probability of failing on the estimations increases since multiple items of input data are estimated separately, without considering the rest of the input streams. In the present example, this situation might appear when two streams (for example, stream 11-1 and stream 11-3) are missing and the corresponding sketches available for each of them are used instead.

In addition, sketching methods work well with numerical values. However, in the present example, if data in stream 11-3 (which provides humidity readings) take the form of a text labels (e.g. "very-high", "high", "normal", "low", "dry", "very-dry" etc.) then statistical methods based on numerical calculations alone will not be sufficient to predict future values, as extra interpretation logic will be required for the processing semantics of non-numeric values.

Thus, there remains a considerable need (especially in time-critical DSMS applications) to reduce data processing latencies in the DSMS in order to provide a fast response, particularly in instances where one or more values from one or more input data streams are not available for executing the one or more continuous queries.

SUMMARY

Although sketching approaches can be used in a DSMS to predict input values when those are missing in the corresponding input data stream at a given time, the continuous query/queries must be executed in any case after estimating the missing values. Observing that this may be detrimental to the performance of the DSMS which, for many applications, is intended to process data from a plurality of input data streams, execute the corresponding CQs and generate the corresponding output data streams, in real-time, the present inventors have conceived a mechanism for reducing data stream processing latency in a DSMS that allows an estimate of the CQ execution result to be generated quickly, and which avoids the time-consuming processing operations associated with CQ execution and, where required, sketch evaluation.

More specifically, the present invention provides in a first aspect a continuous query result estimator for use in a data stream management system to reduce data stream processing times, the data stream management system being configured to execute a continuous query against data items received via at least one input data stream to generate at least one output data stream. The continuous query result estimator comprises a classification module configured to classify a set of at least one data item received via the at least one input data stream into one of a plurality of input data groups, and a data store configured to store, in association with each of the input data groups, a respective rule for estimating a result of executing the continuous query against a data item belonging to the input data group. The continuous query result estimator also includes a result estimation module configured to select a rule from the rules stored in the data store on the basis of the classification performed by the classification module, and apply the selected rule to the received set of data items to generate an estimate for a result of executing the continuous query against the received set of data items.

The classification of the received set of data items by the classification module into one of the input data groups, selection of an appropriate stored rule based on the classification, and application of the selected rule to the received one or more data items allows the CQ result estimator to bypass the complex CQ execution process and instead generate an estimate for the CQ execution result using the rule. This mechanism is particularly well-suited to the many data stream processing applications where the goal is to identify trends or provide early notifications or alerts, instead of providing fine-grain accurate results.

Furthermore, in contrast to the approaches outlined above that make use of sketches and histograms, the applicability of the mechanism described herein is not limited to numerical values and extends to any type of input data. In addition, the mechanism can be conveniently provided as a part of a continuous query language or as a new operator for a procedural DSMS.

The present invention provides in a second aspect a method of estimating a result of a continuous query in a data stream management system so as to reduce data stream processing times therein, the data stream management system being configured to execute the continuous query against data items received via at least one input data stream to produce at least one output data stream. The method comprises: classifying a set of at least one data item received via the at least one input data stream into one of a plurality of input data groups; storing in a data store, in association with each of the input data groups, a respective rule for estimating a result of executing the continuous query against a data item belonging to the input data group; and selecting a rule from the rules stored in the data store on the basis of the classification, and applying the selected rule to the received set of data items to generate an estimate for a result of executing the continuous query against the received set of data items.

The present invention further provides a computer program product, comprising a computer-readable storage medium or a signal, carrying computer program instructions which, when executed by a processor, cause the processor to perform a method as set out above.

BRIEF DESCRIPTION OF THE DRAWINGS

Embodiments of the invention will now be explained by way of example only, in detail, with reference to the accompanying figures, in which.

DETAILED DESCRIPTION OF EMBODIMENTS

Embodiment 1

Figure 1:
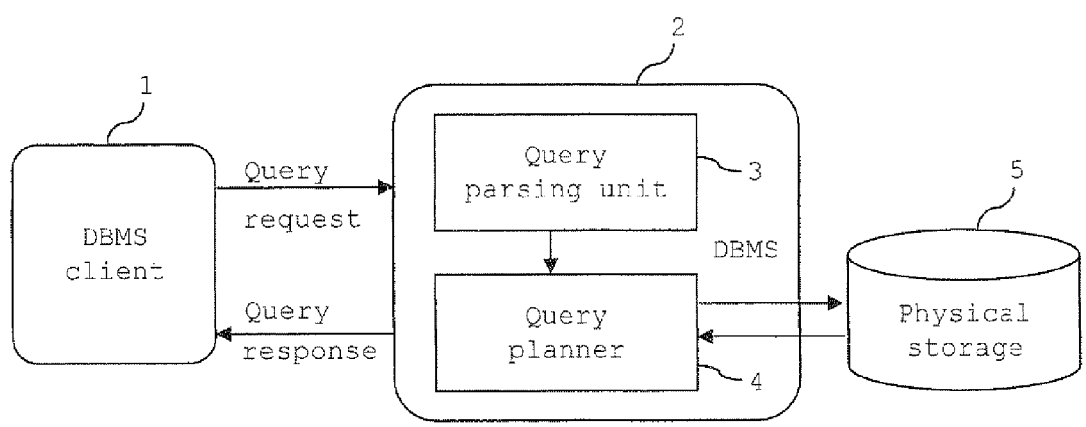
FIG. 1 illustrates the interaction in a conventional system between a DBMS client, a DBMS and a storage device of the DBMS.
Figures 2, 3:
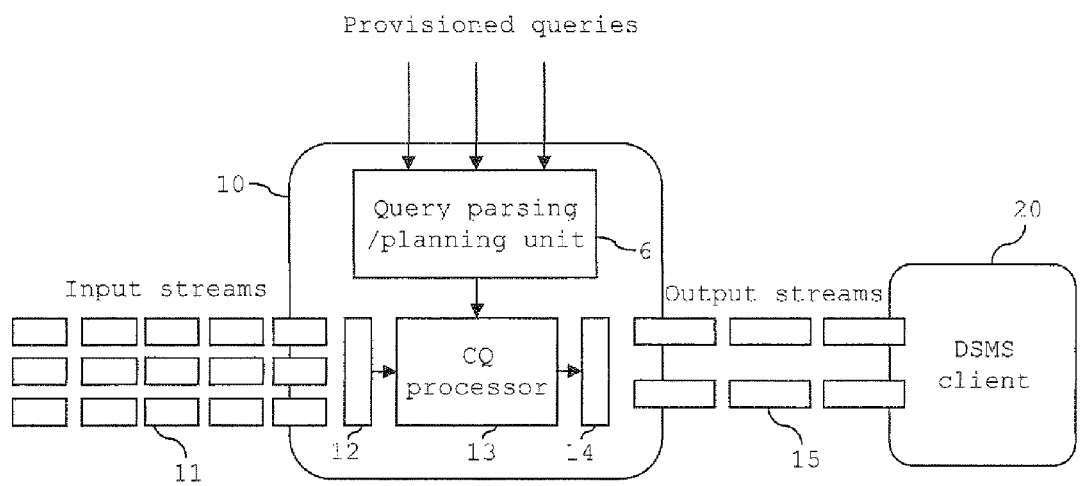
FIG. 2 shows a conventional DSMS serving a DSMS client.
FIG. 3 shows an example of a tuple structure in a data stream.
Figure 4:
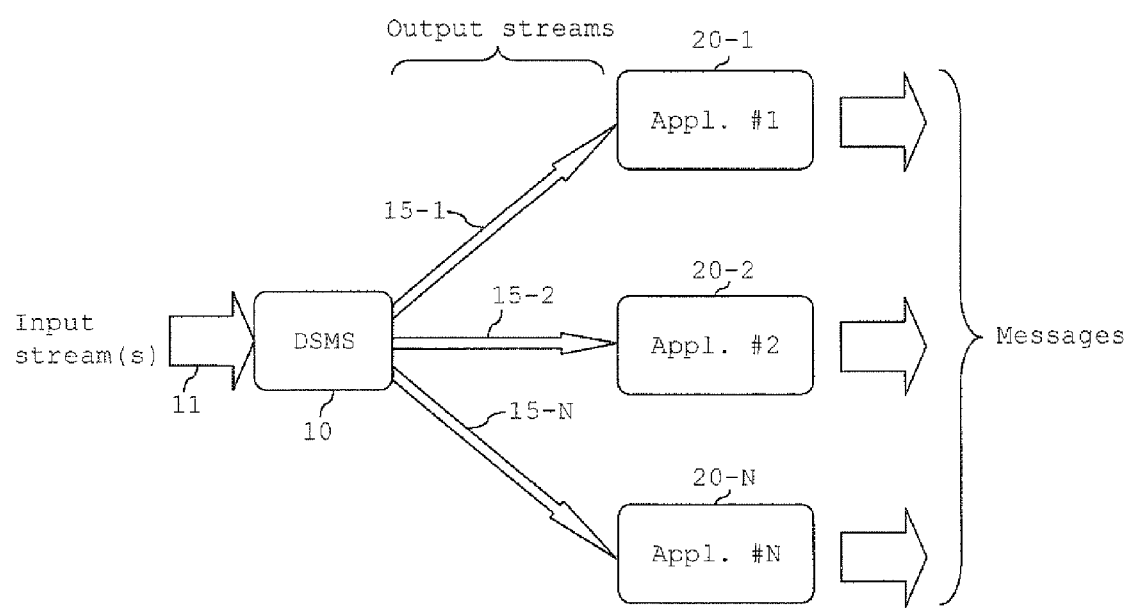
FIG. 4 shows a conventional DSMS serving a number of DSMS client applications.
Figure 5:
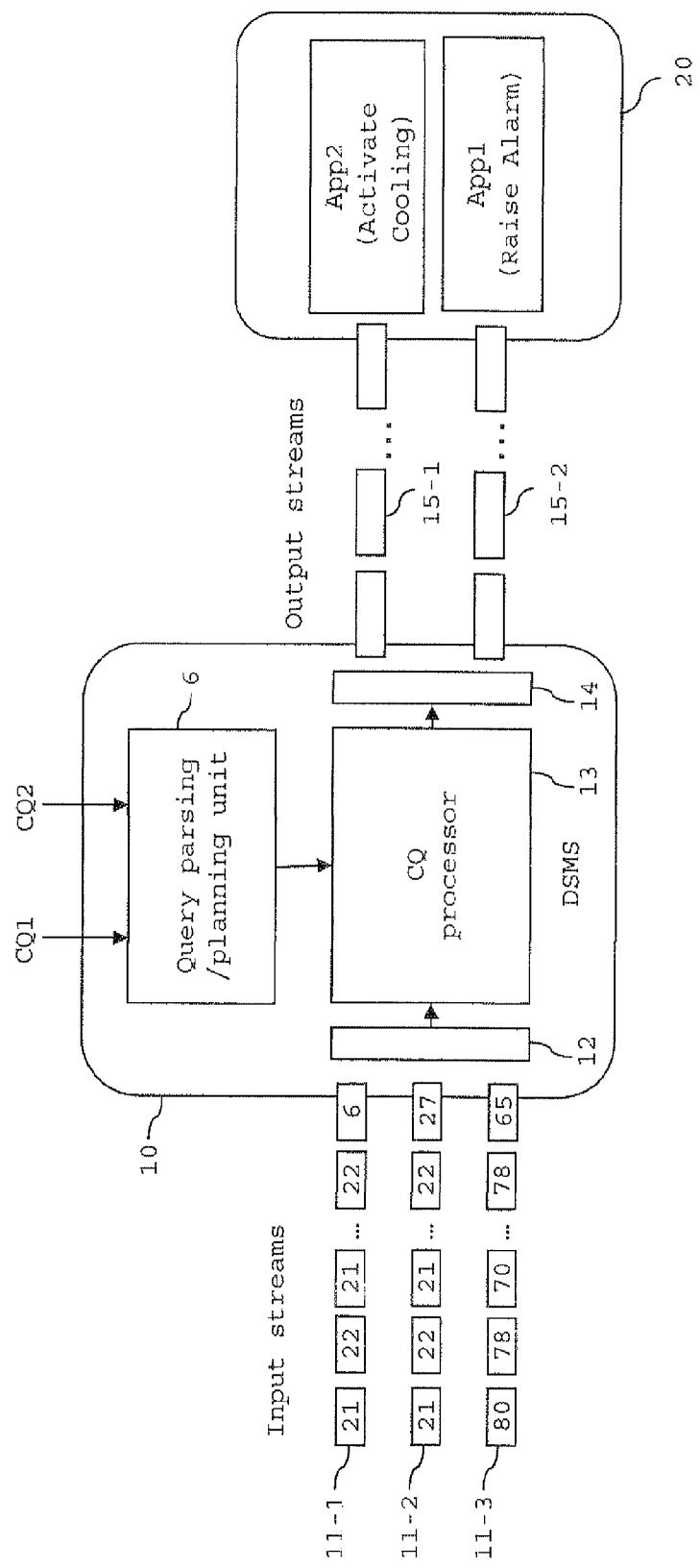
FIG. 5 shows a conventional DSMS deployment being used to control the temperature inside a room.
Figure 6:
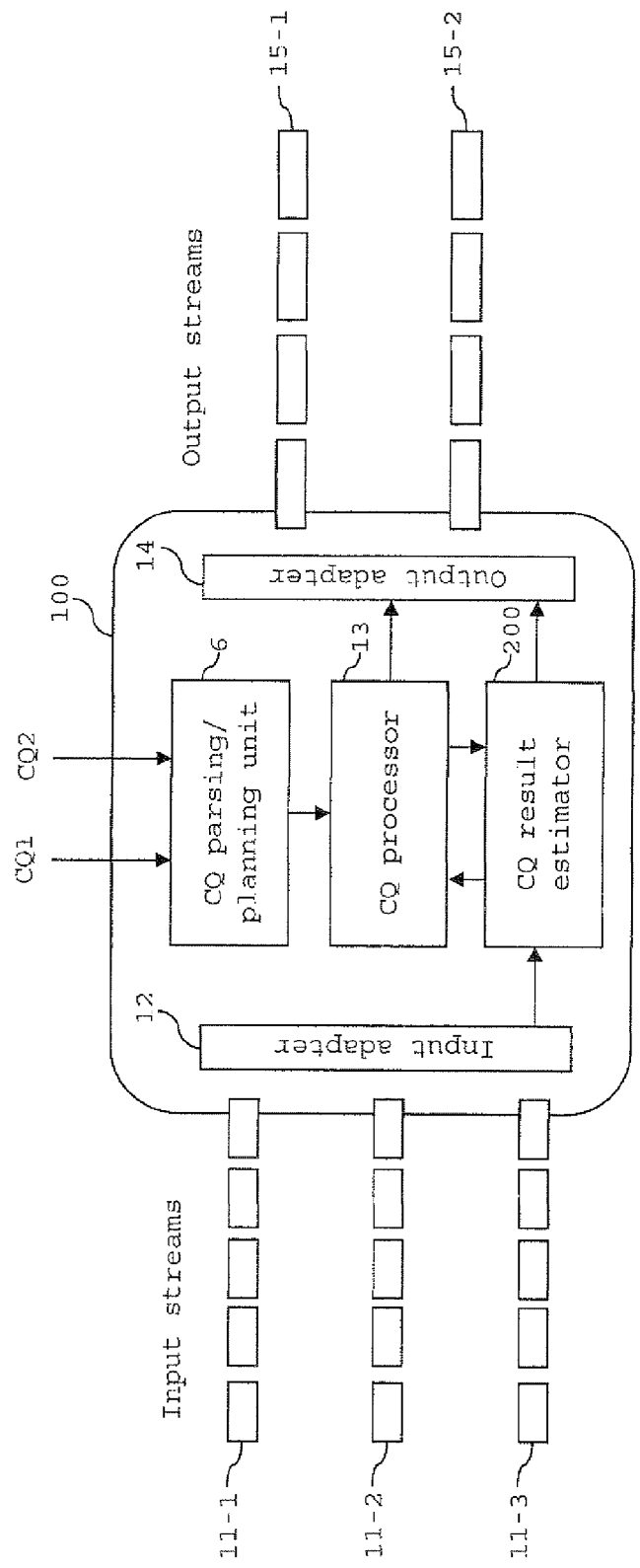
FIG. 6 shows a DSMS comprising a continuous query result estimator according to one of the embodiments of the present invention described herein.

FIG. 6 shows a DSMS 100 according to a first embodiment of the present invention, which is based on the background example DSMS 10 shown in FIG. 5. In these figures, like numerals denote like components of the data stream management systems. For brevity, the description of these common components and other aspects of the background example shown in FIG. 5 will not be repeated here. The following description will focus instead on the key features of the present embodiment that are necessary to understand the invention.

The DSMS 100 comprises a DSMS application deployed on programmable signal processing apparatus, such as a server. The DSMS 100 includes a CQ parsing/planning unit 6, an input adapter 12, a CQ processor 13 and an output adapter 14, as have been described with reference to FIG. 5. Moreover, the DSMS 100 includes a CQ result estimator 200, which functions to reduce data stream processing time in the manner explained below.

Figure 7:
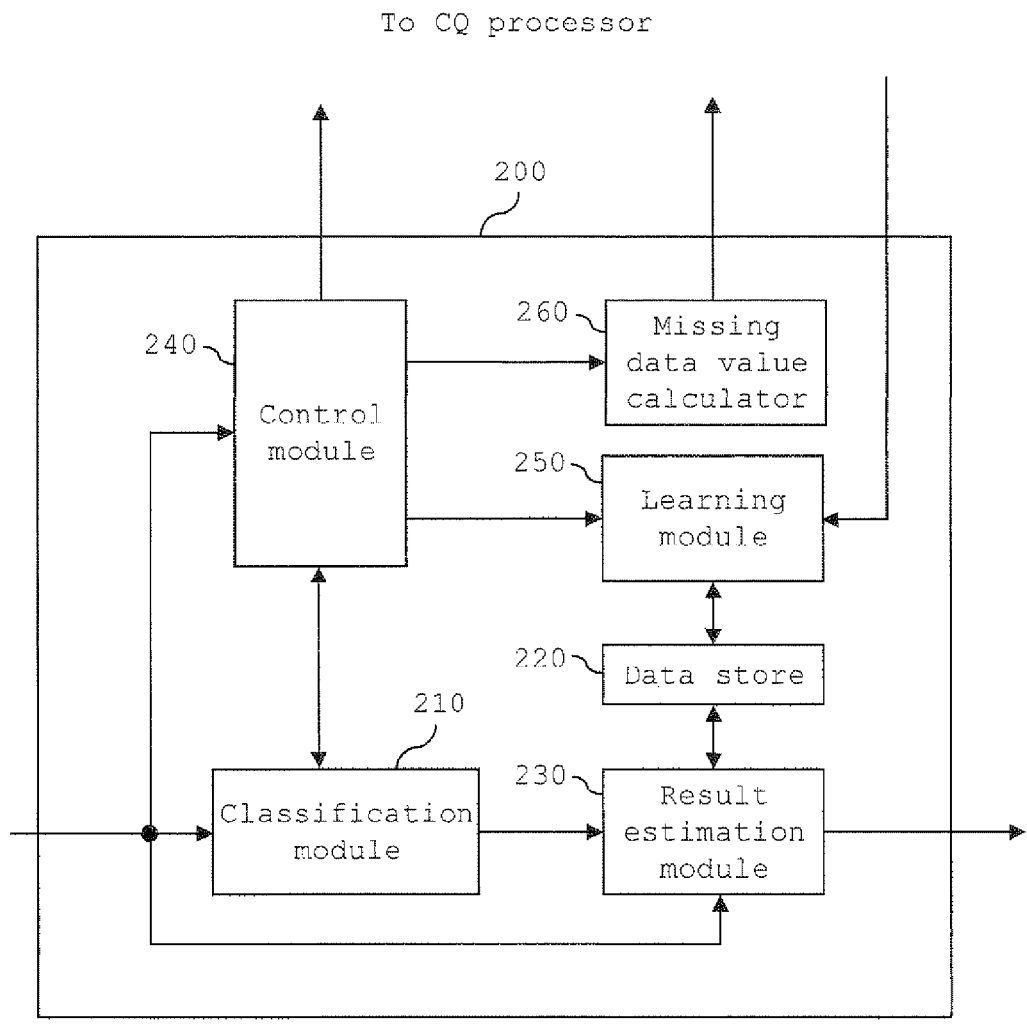
FIG. 7 shows a continuous query result estimator according to a first embodiment of the present invention.

The components of the CQ result estimator 200 and their functional relations are illustrated in FIG. 7. The CQ result estimator 200 comprises a classification module 210, a data store 220, and a CQ result estimation module 230. The CQ result estimator 200 preferably also includes, as in the present embodiment, a control module 240, a learning module 250 and a missing data value calculator 260. The functions of each of these components of the CQ result estimator 200 are explained in the following.

The data store 220 may be non-volatile memory such as a magnetic computer storage device (e.g. a hard disk) or a volatile memory such as DRAM or SRAM. In the present embodiment, the classification module 210, CQ result estimation module 230, control module 240, learning module 250 and missing data value calculator 260 comprise programmable signal processing hardware which implements procedures that may form at least a part of a computer program, module, object or sequence of instructions executable thereby. These procedures, when executed by the signal processing hardware, process stream data in a manner which will be described below.

Figure 8:
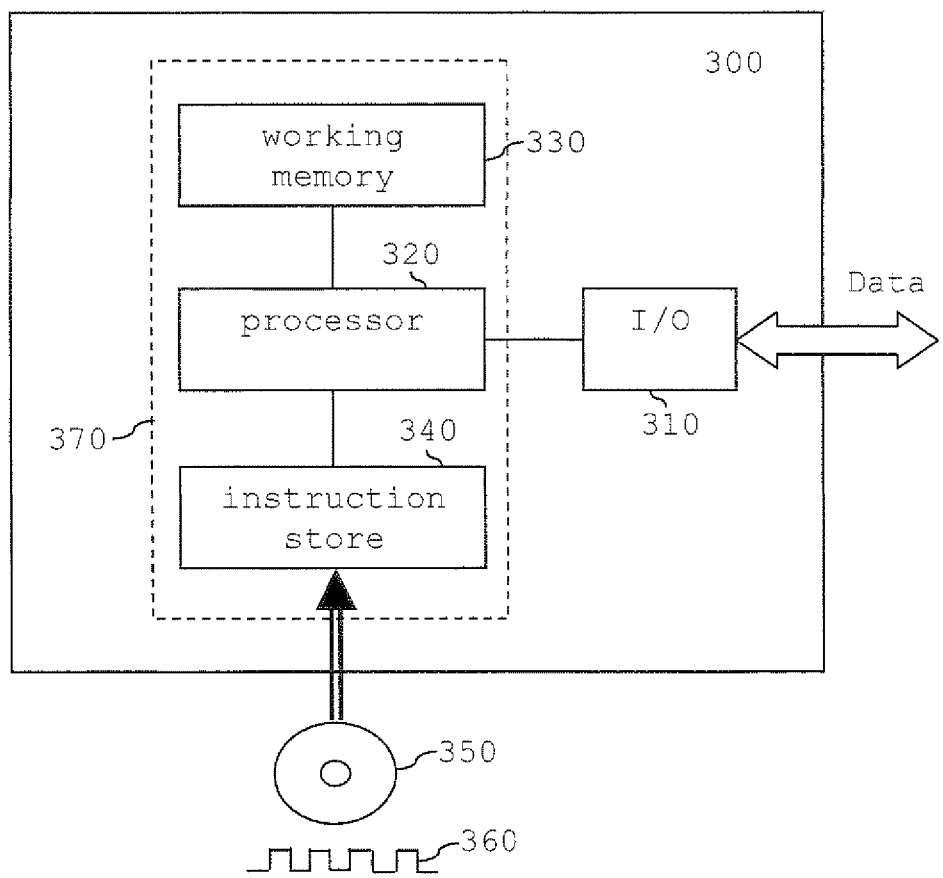
FIG. 8 illustrates an example of computer hardware capable of functioning as a continuous query result estimator according to an embodiment of the present invention.

An example of a general kind of programmable signal processing apparatus in which the CQ result estimator 200 may be implemented is shown in FIG. 8. The signal processing apparatus 300 shown comprises an input/output section 310, a processor 320, a working memory 330, and an instruction store 340 storing computer-readable instructions which, when executed by the processor 320 cause the processor 320 to function as a CQ result estimator in performing the processing operations hereinafter described to process stream data in a way that reduces the latency in the DSMS.

The instruction store 340 is a data storage device which may comprise a non-volatile memory, for example in the form of a ROM, a magnetic computer storage device (e.g. a hard disk) or an optical disc, which is pre-loaded with the computer-readable instructions. Alternatively, the instruction store 340 may comprise a volatile memory (e.g. DRAM or SRAM), and the computer-readable instructions can be input thereto from a computer program product, such as a computer-readable storage medium 350 (e.g. an optical disc such as a CD-ROM, DVD-ROM etc.) or a computer-readable signal 360 carrying the computer-readable instructions.

The working memory 330 functions to temporarily store data to support the processing operations executed in accordance with the processing logic stored in the instruction store 340. As shown in FIG. 8, the I/O section 310 is arranged to communicate with the processor 320 so as to render the signal processing apparatus 300 capable of processing received signals and communicating its processing results.

The combination 370 of the processor 320, working memory 330 and the instruction store 340 (when appropriately programmed by techniques familiar to those skilled in the art) together constitute the classification module 210, CQ result estimation module 230, control module 240, learning module 250 and missing data value calculator 260 of the CQ result estimator 200 of the present embodiment. The combination 370 also performs the other operations of the DSMS 100 that are described herein.

In the present embodiment, a rule for estimating a result of executing a CQ against a received set of one or more data items, which rule has previously been generated and stored in the data store 220 (or simply programmed into the data store 220 by a user), can be used irrespectively of whether all the necessary data values from input data streams are available at the time a continuous query is supposed to be executed. In other words, in case of there being available a rule that is appropriate for the received data, then instead of the CQ processor executing a CQ against the received data, the CQ result estimator 200 of the DSMS 100 generates an estimate (or approximation) of the output results using that rule.

The operations performed by the DSMS 100 of the present embodiment to process stream data will now be described with reference to FIG. 9.

The process starts in step S101, where a user or an external application delivers continuous queries CQ1 and CQ2 into the CQ parsing/planning unit 6 of the DSMS 100. The continuous queries in the present embodiment are the same as those in the example of FIG. 5, namely:

CQ1: IF Avg($T_{sensor\_1}, T_{sensor\_2}$)>26° AND $H_{sensor\_3}$<80% THEN Activate Cooling CQ2: IF Avg($T_{sensor\_1}, T_{sensor\_2}$)>28° AND $H_{sensor\_3}$<30% THEN Raise Alarm In step S102, the classification module 210 collects a set of one or more input data items from input adaptor 12. In the present embodiment, three input streams provide the DSMS 100 with data in the form of tuples. These tuples contain the information that has to be used to solve the query in each iteration. Every tuple contains a time stamp which identifies the moment at which the tuple arrived at the DSMS 100.

Considering the aforementioned example, the collected input data can be presented as shown in Table 1. Each column represents an input stream and each row the values of data delivered into the system at each time (represented by a time stamp). Each row constitutes a data item that will be referred to herein as an "input case".

TABLE 1

| Time | Sensor 1 (° C.) | Sensor 2 (° C.) | Sensor 3 (% Humidity) |
|---|---|---|---|
| 0 | 21 | 21 | 80 |
| 1 | 22 | 22 | 78 |
| 2 | 21 | 21 | 70 |
| 3 | 22 | 22 | 78 |
| T | 26 | 27 | 65 |
| T + k | 29 | 28 | 25 |

During conventional operation, the DSMS 100 receives input data from all of the input data streams 11-1 to 11-3 and creates an input case. The CQ processor 13 would then normally execute continuous queries CQ1 and CQ2 to generate the corresponding CQ execution results for the input case.

However, in the present embodiment, once the CQ result estimator 200 has received an input case, it determines whether the input case can be classified as belonging to one of a number of known groups of input cases (in other words, clusters of input cases) and, if so, selects a rule that can be used to generate an estimate for the result of executing CQ1 when applied to members of the corresponding cluster, and then applies the selected rule to the input case. An estimate for the result of executing CQ2 is similarly determined. Thus, the CQ result estimator 200 generates an estimate for the result of executing a particular continuous query wherever possible, thereby reducing the need for the time-consuming data processing operations that would otherwise be performed by the CQ processor 13.

More specifically, in step S103, the classification module 210 attempts to classify the input case into one of the clusters of input cases (also referred to herein as input data groups) that are stored in the data store 220 (or which might otherwise be stored within the classification module itself, for example). The closest input data group, i.e. the one providing the best match, is preferably selected by the classification module 210 using a similarity measure. More specifically, the classification module 210 classifies the received set of data items by calculating for each of the input data groups a respective value of a similarity measure using the received input case, and selecting an input data group on the basis of the calculated similarity measure values. This similarity measure estimates how close the input case is to the input cases in each input data group, and as such provides a measure of the suitability of the rules associated with each group. The similarity measure may, for example, be a Euclidian or Manhattan similarity measure. Regardless of its particular form, the similarity measure allows the classification module 210 to determine the closest matching input data group and thus the most appropriate rule(s) (associated with the determined input data group) to be applied to the input case in respect of CQ1 and CQ2.

Then, in step S104, the classification module 210 determines whether its attempt to classify the input case has been successful. If the input case has been classified into one of the known input data groups then the process proceeds to step S105, where the result estimation module 230 accesses the data store 220 in order to select a rule from among the rules stored in the data store 220, the selected rule being associated with continuous query CQ1 or CQ2 and the input data group which has been identified by the classification module 210 as providing the highest degree of similarity to the input case. The selected rule is then applied to the input case in order to generate an estimate for the result of executing CQ1 against the input case. If there is more than one matching rule for an input case, the rule most recently stored in association with that group may be selected. A rule for generating an estimate of the CQ2 execution result is similarly determined by the result estimation module 230, and then applied to the input case.

In the embodiments described herein, a rule takes the form of a decision tree whose branches can be navigated to arrive at the estimate of the result of executing the continuous query based on data values in the input case. In other words, a decision tree is a classifier in the form of a tree structure, where each node in the tree is either a leaf node indicating the approximated value for the query result, or a decision node that specifies some test to be carried out on a single attribute to choose one way down to a leaf node. Thus, starting from an input case, the decision tree can be used to approximate the query answer starting at the root of the tree and moving through it until a leaf node, which provides the approximated value. In this way, the rule allows the result estimation module 230 to estimate the CQ result in a simple and computationally efficient way, without performing the relatively time-consuming process of executing the continuous query whose results the selected rule approximates. Furthermore, since the classification does not require all of the elements of the input case to be available to the classification module 210, and since the associated rule selected by the result estimation module 230 may require only some of the input case elements to be available for its application, the CQ result estimator 200 of the present embodiment is able to generate the CQ result estimate without having to previously estimate any missing elements in the input case.

Where the input case has been successfully classified by the classification module 210 and the CQ result then estimated by the result estimation module 230 in step S105, the process proceeds to step S106, where the CQ result estimate is output by the result estimation module 230 to the output adapter 14. The process then loops back to step S102, and the next input case is processed.

On the other hand, if the classification of the input case is determined not to have been successful in step S104, then the control module 240 determines in step S107 whether any of the data values whose presence in the input case it expects to detect are missing. In general, the input case might contain all input values, e.g. (21, 21, 80), or have some of the values missing e.g. (21, ?, 80). In the latter example, values for streams 1 and 3 (i.e. 11-1 and 11-3 in FIG. 6) were available to the CQ result estimator 200 while the value for stream 2 (11-2) was missing when the input case was created. If the control module 240 determines in step S107 that one or more values are missing in the input case (in other words, that the value of at least one element of the input case is missing or matches a default value (e.g. "0") stored in the CQ result estimator 200), it causes the missing data calculator 260 to generate in step S108 an estimate of the missing value(s) by means of statistical regression (in case of numerical values in the input stream), or substitute for each missing value the last value seen at the input. In another embodiment, the CQ result estimator 200 may alternatively wait for the missing data value(s) to be received, with the control module repeatedly checking for its/their receipt. It is noted that if the missing value is of an attribute which is linearly dependent on a second attribute, then the decision tree does not take that first attribute into account in its structure.

Following step S107, and any estimation of missing value(s) that might have occurred in step S108, the process proceeds to step S109. In this case, since the attempted classification was determined in step S104 not to have been unsuccessful, the CQ result estimator 200 is unable to generate a sufficiently reliable estimate for the CQ execution result and therefore instead feeds the input case together with any estimated values which may have been generated by the missing data value calculator 260 to the CQ processor 13. The CQ processor 13 then solves continuous queries CQ1 and CQ2 using this information and outputs the results of the CQ execution to the output adapter 14 in step S106.

Besides executing the continuous queries CQ1 and CQ2 against the input case (as supplemented in step S108 by any estimates for missing data values that might have been required), the DSMS 100 of the present embodiment stores the input case and the corresponding CQ execution result in the data store 220, in order to be able to learn a new rule for approximating the result of executing a CQ against a similar input case that might be encountered subsequently in the DSMS's data processing operation.

More specifically, in step S110, the control module 240 causes the learning module 250 to receive the input case as well as the results of executing the continuous queries CQ1 and CQ2 against the input case, the latter results having been fed back to the learning module 250 by the CQ processor 13. The learning module 250 then stores the input case in association with the corresponding CQ execution result, in the data store 220. The combination of each input case and its corresponding CQ execution result is referred to herein as a "learning case".

Table 2 shows an example of a set of learning cases which is created for CQ1 during operation of the DSMS 100 of the present embodiment, while Table 3 shows the learning cases generated for CQ2.

TABLE 2

| Time | Sensor 1 (° C.) | Sensor 2 (° C.) | Sensor 3 (% Humidity) | CQ1 Result |
|---|---|---|---|---|
| 0 | 21 | 21 | 80 | No action |
| 1 | 22 | 22 | 78 | No action |
| 2 | 21 | 21 | 70 | No action |
| 3 | 22 | 22 | 78 | No action |
| T | 26 | 27 | 65 | Activate cooling |
| T + k | 29 | 28 | 25 | Activate cooling |

TABLE 3

| Time | Sensor 1 (° C.) | Sensor 2 (° C.) | Sensor 3 (% Humidity) | CQ2 Result |
|---|---|---|---|---|
| 0 | 21 | 21 | 80 | No action |
| 1 | 22 | 22 | 78 | No action |
| 2 | 21 | 21 | 70 | No action |
| 3 | 22 | 22 | 78 | No action |
| T | 26 | 27 | 65 | No action |
| T + k | 29 | 28 | 25 | Raise Alarm |

The last entry in each of the rows in Tables 2 and 3 shows the result of a successful execution of continuous query CQ1 (Table 1) or CQ2 (Table 2). Thus, the learning module 250 stores in the data store 220 the input data (the values for each of the input streams) as well as the result each query produced using those input data. Accordingly, a learning example describes the behavior exhibited by a query when it was executed using some particular input data (input case). A collection of learning cases can be stored by the DSMS 100 during a certain time, and may be refreshed with the most recent input data and the subsequently produced output data.

The rule generation process uses all available learning examples, as illustrated in Tables 2 and 3, and aims to generalize the learning examples to produce decision trees. For example, the learning module may use the C4.5 algorithm on the data presented in Table 2 to generate a decision tree for the cluster of input cases shown in the table. Those skilled in the art will appreciate that other learning algorithms could alternatively be used. A resulting decision tree for CQ1 may be expressed as the following rule (although other representations are also possible):

IF $T_{sensor\_1} < 26°$ AND $H_{sensor\_3} > 70\%$
  THEN Query result = "No action"
ELSE IF $T_{sensor\_1} \geq 26°$ AND $H_{sensor\_3} \leq 65\%$
  THEN Query result = "Activate cooling"

In this example of a rule that may be generated by the learning module 250 from the available learning cases, the temperature reported by one of the sensors (i.e. sensor 2) does not appear in the decision tree structure, which means that the CQ result estimation module 230 will be able to use the rule to generate an appropriate CQ result estimate even when one or more data values are missing from the associated input data stream in a given time interval (in the present example, the data from sensor 2), whilst data from other input data streams are available (in the example, data from sensor 1 and sensor 3). The same approach can be followed to generate the corresponding rule for the query CQ2.

These rules may be generated online (as in the present embodiment), with the query answers generated by the query processor 13 contributing to the pool of learning cases stored in the data store 220, and a rule being generated by the learning module 250 in step S111 once a sufficient number of related learning cases have become available. Alternatively, the rules may be generated by the learning module 250 in a batch process, which generates and updates them from time to time. The rule learning process and CQ result estimation may also be conducted by the CQ result estimator in parallel. In any of these cases, the rules generated by the learning module 250 are stored by the learning module 250 in the data store 220, each in association with a respective cluster of input cases.

Figure 9:
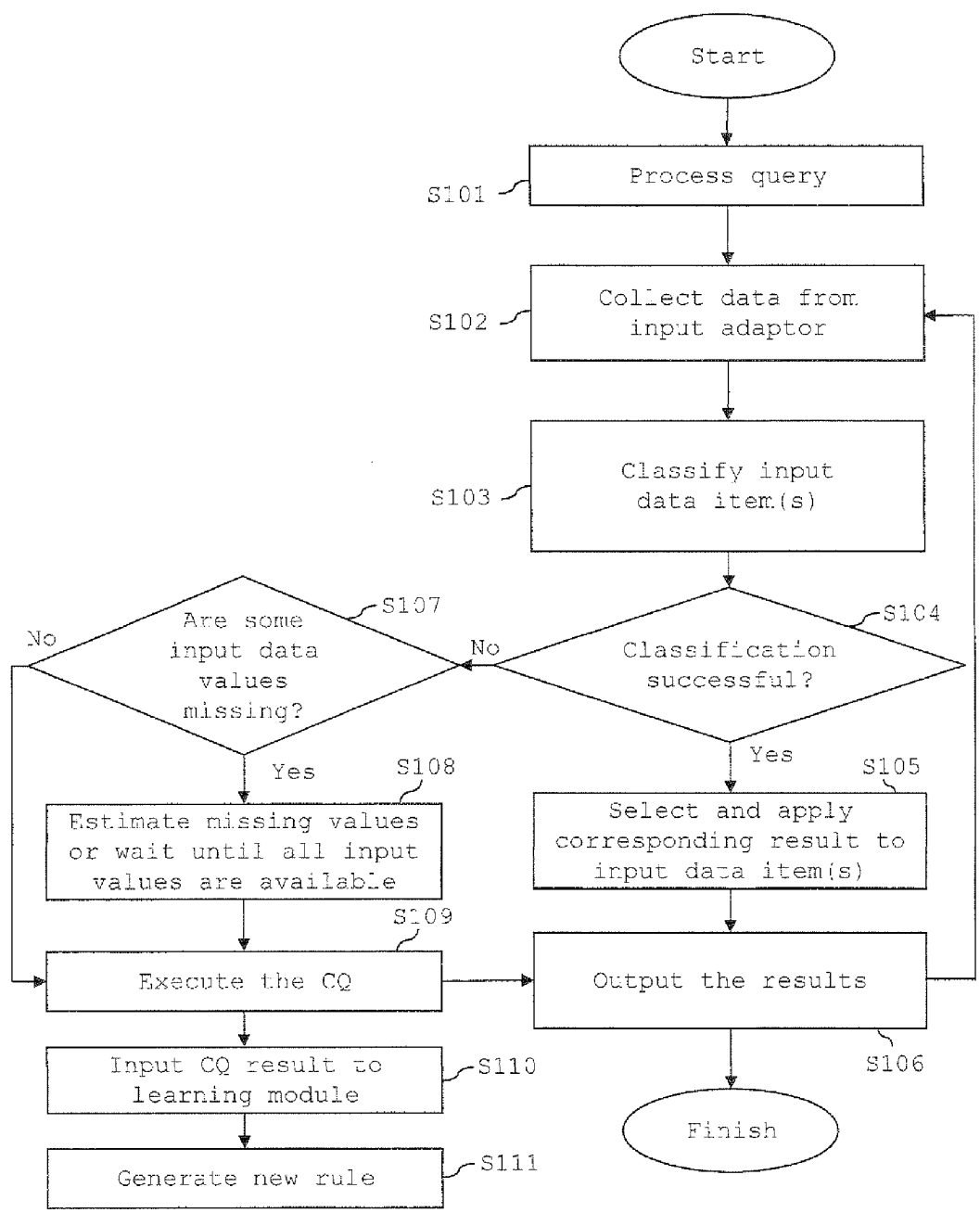
FIG. 9 is a flow diagram illustrating a method of processing data in a DSMS comprising a continuous query result estimator according to the first embodiment of the present invention.

In the case where no rules have been stored in the data store 220 prior to execution of the process illustrated in FIG. 9, the DSMS 100 will execute CQ1 and CQ2 against input cases until at least one rule for approximating a CQ execution result has been learned by the learning module 250 and stored in the data store 220. Thus, after a number of iterations (i.e. after executing CQs over the corresponding, available data from the input data streams) some rules will have been generated by the rule generation process described above, allowing the above-described CQ result estimation mechanism to improve the speed of the data stream processing performed by the DSMS 100. If there is more than one rule for an input case, the latest pattern selected from that group may be selected.

Embodiment 2

A second embodiment of a DSMS according to the present invention, which is capable of processing stream data with higher accuracy (although with greater latency) than the first embodiment, will now be described with reference to FIGS. 6, 7 and 10.

The DSMS of the present embodiment has the same structural components as the DSMS 100 of the first embodiment shown in FIG. 6, although the configurations of some of the modules of the CQ result estimator 200 differ in certain respects, as will now be explained.

In brief, the CQ result estimator 200 of the present embodiment functions to determine, for each input case, whether the value of at least one element of the input case is missing (in the sense that the element either contains a null value or a default value recognised by the control module 240). If no values are missing the input case is passed to the CQ processor 13 for processing in the conventional manner, thereby ensuring that accurate stream processing results are achieved wherever possible. However, if one or more data values are found to be missing in an input case, then a CQ result estimation mechanism as described in the first embodiment is employed to generate an estimate of the CQ execution result in a more efficient way than can be achieved using conventional approaches (e.g. using sketches).

The operations performed by the DSMS 100 of the present embodiment to process stream data will now be described with reference to FIG. 10.

Steps S201 and S202 correspond to process steps S101 and S102 of the first embodiment, respectively, and their description will therefore not be repeated here.

In step S203, the control module 240 detects whether one or more data values which it expects (e.g. as a consequence of applying user-specified criteria or the results of a learning process) form part of the input case are missing from the input case that has been assembled using data from the input adapter 12. As noted above, if the input case is determined by the control module 240 to be complete, it is passed to the CQ processor 13 and processed thereby in step S209 in accordance with the query plans for CQ1 and CQ2. As in the first embodiment, the CQ processing results may be fed by the CQ processor 13 back to the learning module 250 of the CQ result estimator 200 to allow a new CQ estimation rule to be generated. The process by which this is done in steps S210 and S211 is the same as that described with reference to steps S110 and S111 of the first embodiment.

On the other hand, if the control module determines in step S203 that the input case is incomplete (i.e. that the value of at least one element of the input case is missing or matches a default value (e.g. "0") stored in the CQ result estimator 200), then the process proceeds to step S204, where the control module 240 triggers the classification module 210 to classify the input case into one of the input data groups, in the same manner as in step S103 of the first embodiment.

In a variant of the second embodiment, the control module 240 could alternatively execute a first detection of an absence of one or more expected data values in the input case, and a second such detection after a prescribed time interval from the first detection. If one or more expected data values are determined in the second detection to be missing, then the control module 240 could be arranged to trigger classification module 210 to classify the received input case. In this variant, a timer can be defined so that, when a number of data from incoming data streams are at a given moment ready for executing a CQ, and some other data are sill missing at that moment, the timer defines a delay threshold for receiving the missing data from the corresponding incoming data streams. Upon time-out of this timer, the CQ result estimation process can be run so as to generate an output data stream comprising the approximation (as determined by the corresponding rule) instead of the actual CQ execution result that would be produced if the missing data was/were available, or based on an estimation of the missing data.

In the present embodiment (or the variant thereof set out above), the control module 240 may trigger the classification of the input case by the classification module 210 when the number or proportion of expected data values determined to be missing from the input case is at or below a threshold value.

Then, in step S205, the classification module 210 determines whether its attempt to classify the input case has been successful. If the input case has been classified into one of the known input data groups then the process proceeds to step S206, where the result estimation module 230 accesses the data store 220 in order to select a rule from among the rules stored in the data store 220, the selected rule being associated with continuous query CQ1 or CQ2 and the input data group which has been identified by the classification module 210 as providing the highest degree of similarity to the input case. The selected rule is then applied to the input case in order to generate an estimate for the result of executing CQ1 against the input case. If there is more than one matching rule for an input case, the rule most recently stored in association with that group may be selected. A rule for generating an estimate of the CQ2 execution result is similarly determined by the result estimation module 230, and then applied to the input case.

Where the input case has been successfully classified by the classification module 210 and the CQ result then estimated by the result estimation module 230 in step S206, the process proceeds to step S207, where the CQ result estimate is output by the result estimation module 230 to the output adapter 14. The process then loops back to step S202, and the next input case is processed.

On the other hand, if the classification of the input case is determined in step S205 not to have been successful, then the control module 240 causes the missing data calculator 260 to generate in step S208 an estimate of the missing value(s) in the input case in the same manner as in step S108 of FIG. 9, which is described above in connection with the first embodiment.

Following the estimation of missing value(s) in step S208, the process proceeds to step S209. In step S209, the CQ result estimator 200 feeds the input case together with the estimated value(s) generated by the missing data value calculator 260 to the CQ processor 13. The CQ processor 13 then solves continuous queries CQ1 and CQ2 using this information and outputs the results of the CQ execution to the output adapter 14 in step S207.

Besides executing the continuous queries CQ1 and CQ2 against the input case (as supplemented in step S208 by any estimates for missing data values that might have been required), the DSMS 100 of the present embodiment stores the input case and the corresponding CQ execution result in the data store 220, in order to be able to learn a new rule for approximating the result of executing a CQ against a similar input case that might be encountered subsequently in the DSMS's data processing operation. The learning process proceeds in steps S210 and S211 in the same manner as in the corresponding steps S110 and S111 of the first embodiment.

Embodiment 3

Figure 10:
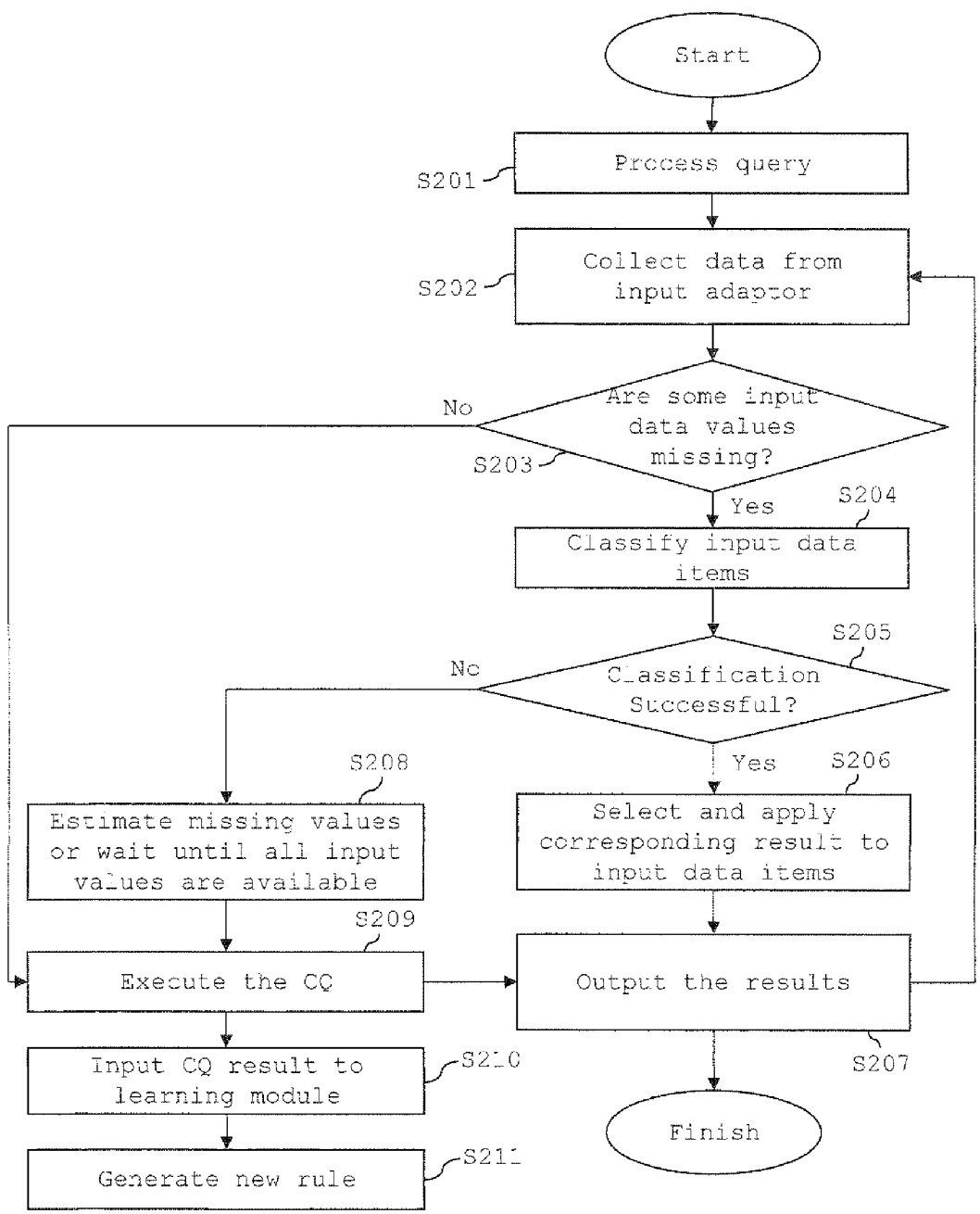
FIG. 10 is a flow diagram illustrating a method of processing data in a DSMS comprising a continuous query result estimator according to a second embodiment of the present invention.

As noted above, the control module 240, learning module 250 and missing data value calculator 260 may be included in the CQ result estimator 200 in order to allow it learn new rules in an efficient way, thus allowing the result estimator to improve the DSMS's data stream processing efficiency autonomously over a number of iterations of the process steps shown in FIG. 9 or 10. However, there may be applications where the associated additional complexity and cost is not justified, and in these cases the CQ result estimator may be provided in the simpler form of the third embodiment shown in FIG. 11.

Figure 11:
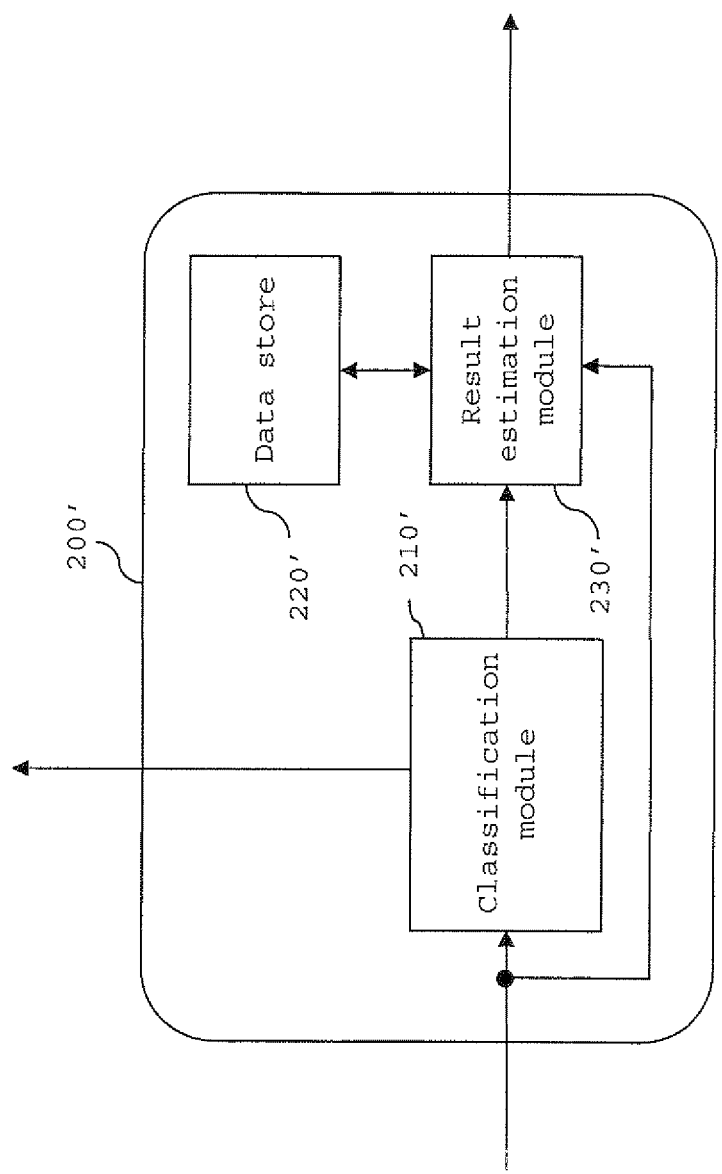
FIG. 11 shows a continuous query result estimator according to a third embodiment of the present invention.
Figure 12:
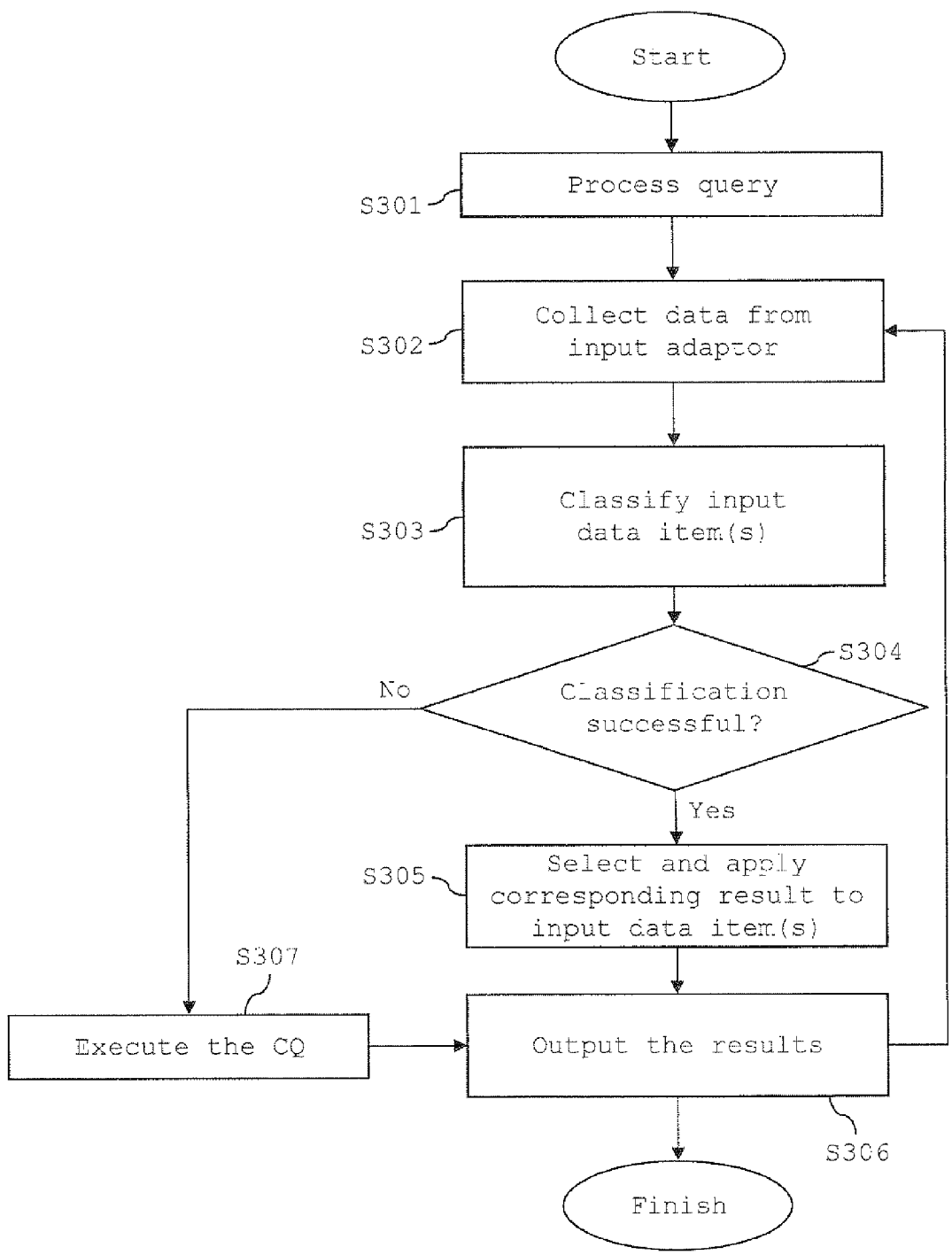
FIG. 12 is a flow diagram illustrating a method of processing data in a DSMS comprising a continuous query result estimator according to the third embodiment.

As shown in FIG. 11, the CQ result estimator 200' of the present embodiment comprises a classification module 210', a data store 220' and a result estimation module 230'. The data stream processing operations performed by the CQ result estimator 200' of the present embodiment will now be described with reference to FIG. 12.

The data processing operations performed by the CQ result estimator 200' in steps S301 to S306 to generate an estimate for the result of executing CQ1 and CQ2 against the input case are the same as those in steps S101 to S106, which have been described above in connection with the first embodiment. The operation of the CQ result estimator o 200' of the present embodiment differs from the CQ result estimator 200 of the first embodiment in that where the classification module 210 determines that its attempted classification of the input case has been unsuccessful, no attempt is made either to establish if any input data values are missing or to store and subsequently learn from the CQ execution result generated by the CQ processor 13; in this case, the classification module simply sends the input case values to the CQ processor 13, which executes continuous queries CQ1 and CQ2 using these values and outputs the CQ execution results to the output adapter 14.

It will be appreciated from the foregoing description of embodiments that the mechanism described herein is generally applicable to a DSMS which, normally, executes one or more continuous queries on data received via one or more input data streams so as to produce, based on an executed CQ, one or more output data streams.

The mechanism allows the DSMS to produce one or more output data streams when one or more data values from the corresponding input data stream(s) is/are missing whilst the other(s) is/are already available to the DSMS. Instead of executing a CQ based on the available data and on a statistical prediction of the missing data, the mechanism described herein involves producing by the DSMS an output data stream based on rules that are derived from CQ outputs produced by the DSMS earlier, when all the corresponding data from the input data stream(s) were available, and when the corresponding CQs were executed with data actually received from input data streams in due time.

The result of a continuous query can be approximated without necessarily having to estimate the missing values of one or more input data streams for said query, and without having to execute the query afterwards. This is achieved by determining how similar all the currently available values at the input streams are compared to past executions of the same continuous query and, in case of there being a similar past execution, using the associated approximation instead.

In some embodiments of the present invention, successful executions of a continuous query may be gathered so that the input data used by the query and the output result these data have produced after executing the query are stored. When one or more input streams arrive with a lower frequency than the others or a low latency answer is required, the data which are currently available from the input can be analysed using the stored input data in the manner described above, and the query results estimated using rules derived from stored CQ result data which was obtained from previous executions of the query. In case of finding a similar previous example, the stored approximation of the query result is provided instead. This has the advantage of delivering good estimates for the query results without needing to wait for the missing input data, and without having to then execute the continuous query.

Accordingly, the mechanism described herein reduces the latency of the DSMS by bypassing the time-consuming CQ execution process to instead provide an estimate of the CQ result, wherever possible. Furthermore, the mechanism increases the accuracy of the result obtained when some of the input data is missing (as compared to conventional approaches taken in these circumstances, such as those that employ sketches) because the result of the query is estimated taking into account all available input streams at the same time, rather than estimating missing values in one or more of the streams independently of the other streams and afterwards execute the continuous query using the estimates of the missing values.

In the above embodiments, the CQ result estimator can be activated to operate in the manner described when time is critical or one or more input streams arrive slower, so that the DSMS would otherwise have to wait for an unacceptable period of time until all of the required data become available. Under these circumstances, the CQ result estimator can generate a fast response, predicting with some degree of certainty what output should be produced considering only the data that it is already available at that time. Therefore, available data is sent to the classification module and the result estimation module of the CQ result estimator, and the most appropriate rule is applied to the data instead. The approximation for the result generated in this way is then provided to the client applications of the DSMS.

Modifications and Variations

Many modifications and variations can be made to the embodiment described above.

For example, in the embodiments described above the classification module 210, CQ result estimation module 230, control module 240, learning module 250 and missing data value calculator 260 of the CQ result estimator 200 are each provided using programmable processing apparatus 300 having a processor 320 which provides the respective functions of these components by executing software instructions stored in instructions store 340. However, it will be appreciated that each or all of the aforementioned components may be implemented in dedicated hardware, e.g. FPGA.

The invention claimed is:

1. A continuous query result estimator for use in a data stream management system to reduce data stream processing times, the data stream management system being configured to execute a continuous query against data items received via at least one input data stream to generate at least one output data stream, the continuous query result estimator comprising:
a classification module configured to classify a set of at least one data item received via the at least one input data stream into one of a plurality of input data groups;
a data store configured to store, in association with each of the input data groups, a respective rule for estimating a result of executing the continuous query against a data item belonging to the input data group; and
a result estimation module configured to:
select a rule from the rules stored in the data store on the basis of the classification performed by the classification module; and
apply the selected rule to the received set of data items to generate an estimate for a result of executing the continuous query against the received set of data items.

2. The continuous query result estimator according to claim 1, further comprising:
a control module configured to:
detect an absence of at least one expected data value in the received set of data items; and
upon detecting an absence of at least one expected data value in the received set of data items, trigger the classification of the received set of data items by the classification module.

3. The continuous query result estimator according to claim 1, further comprising:
a control module configured to execute a first detection of an absence of at least one expected data value in the received set of data items, and a second detection of the absence of at least one expected data value in the received set of data items after a prescribed time interval from the first detection and, if at least expected data values are determined in the second detection to be missing, trigger the classification of the received set of data items by the classification module.

4. The continuous query result estimator according to claim 2, wherein the control module is configured to trigger the classification of the received set of data items by the classification module when one of a number and a proportion of expected data values determined to be missing from the received set of data items is one of at and below a threshold value.

5. The continuous query result estimator according to claim 1, further comprising a learning module configured to:
generate the rules on a basis of received data items and results of executing the continuous query against the received data items; and
store the rules in the data store.

6. The continuous query result estimator according to claim 1, wherein the classification module is configured to:
classify the received set of data items by calculating for each of the input data groups a respective value of a similarity measure using the received set of data items, and
select an input data group on the basis of the calculated similarity measure values.

7. The continuous query result estimator according to claim 1, wherein each of the rules comprises a decision tree whose branches can be navigated to arrive at the estimate of the result of executing the continuous query based on values of the received set of data items.

8. A data stream management system comprising:
a continuous query processor configured to execute a continuous query against data items received via at least one input data stream to produce at least one output data stream; and
a continuous query result estimator including:
a classification module configured to classify a set of at least one data item received via the at least one input data stream into one of a plurality of input data groups;
a data store configured to store, in association with each of the input data groups, a respective rule for estimating a result of executing the continuous query against a data item belonging to the input data group; and
a result estimation module configured to:
select a rule from the rules stored in the data store on the basis of the classification performed by the classification module; and
apply the selected rule to the received set of data items to generate an estimate for a result of executing the continuous query against the received set of data items;
the continuous query processor and the continuous query result estimator are configured such that the continuous query is executed against the received set of data items in the case where the classification module of the continuous query result estimator does not classify the received set of data items into one of the plurality of input data groups, the estimate of the continuous query execution result being generated in the case where the classification module classifies the received set of data items into one of the plurality of input data groups.

9. The data stream management system according to claim 8, wherein the continuous query result estimator further comprises:
a learning module; and
a missing data value calculator operable configured to generate an estimate of at least one missing data value when the control module detects an absence of at least one expected data value in the received set of data items,
wherein the continuous query processor is configured to:
execute the continuous query against received set of data items and estimates for the missing at least one data value generated by the missing data value calculator; and
feed the results of executing the continuous query back to the learning module; and wherein the learning module is configured to:
generate the rules on the basis of received data items and the results fed back by the continuous query processor; and
store the rules in the data store.

10. A method of estimating a result of a continuous query in a data stream management system to reduce data stream processing times therein, the data stream management system being operable configured to execute the continuous query against data items received via at least one input data stream to produce at least one output data stream, the method comprising:
classifying a set of at least one data item received via the at least one input data stream into one of a plurality of input data groups;
storing in a data store, in association with each of the input data groups, a respective rule for estimating a result of executing the continuous query against a data item belonging to the input data group; and
selecting a rule from the rules stored in the data store on the basis of the classification; and
applying the selected rule to the received set of data items to generate an estimate for a result of executing the continuous query against the received set of data items.

11. The method according to claim 10, further comprising:
detecting an absence of at least one expected data value in the received set of data items; and
upon detecting an absence of at least one expected data values in the received set of data items, triggering the classification of the received set of data items.

12. The method according to claim 10, further comprising:
executing a first detection of an absence of at least one expected data value in the received set of data items, and a second detection of the absence of at least one expected data value in the received set of data items after a prescribed time interval from the first detection; and
if at least one expected data value are determined in the second detection to be missing, triggering the classification of the received set of data items.

13. The method according to claim 11, wherein the classification of the received set of data items is triggered when one of a number and a proportion of expected data values determined to be missing from the received set of data items is one of at and below a threshold value.

14. The method according to claim 10, further comprising:
generating the rules on the basis of received sets of one or more data items and results of executing the continuous query against the sets of data items, and storing the rules in the data store.

15. The method according to claim 10, wherein the set of received data items is classified by calculating for each of the input data groups a respective value of a similarity measure using the received data items, and selecting an input data group on the basis of the calculated similarity measure values.

16. The method according to claim 10, wherein each of the rules comprises a decision tree whose branches can be navigated to arrive at the estimate of the result of executing the continuous query based on values of the received set of data items.

17. A computer-readable storage medium storing computer program instructions which, when executed by a processor, cause the processor to:
classify a set of at least one data item received via at least one input data stream into one of a plurality of input data groups;
cause storage of, in a data store and in association with each of the input data groups, a respective rule for estimating a result of executing a continuous query against a data item belonging to the input data group;

select a rule from the rules stored in the data store on the basis of the classification; and apply the selected rule to the received set of data items to generate an estimate for a result of executing the continuous query against the received set of data items.

18. The continuous query result estimator according to claim 3, wherein the control module is configured to trigger the classification of the received set of data items by the classification module when one of a number and a proportion of expected data values determined to be missing from the received set of data items is one of at and below a threshold value.

19. The continuous query result estimator according to claim 18, wherein the classification module is configured to:

classify the received set of data items by calculating for each of the input data groups a respective value of a similarity measure using the received set of data items, and select an input data group on the basis of the calculated similarity measure values.

20. The method according to claim 12, wherein the set of received data items is classified by calculating for each of the input data groups a respective value of a similarity measure using the received data items, and selecting an input data group on the basis of the calculated similarity measure values.

* * * * *

UNITED STATES PATENT AND TRADEMARK OFFICE
CERTIFICATE OF CORRECTION

PATENT NO. : 8,762,369 B2  
APPLICATION NO. : 14/113555  
DATED : June 24, 2014  
INVENTOR(S) : Macho et al.

Page 1 of 1

It is certified that error appears in the above-identified patent and that said Letters Patent is hereby corrected as shown below:

Specification

In Column 3, Line 21, delete "streams)" and insert -- stream(s) --, therefor.

In Column 3, Line 22, delete "streams" and insert -- stream --, therefor.

In Column 3, Line 42, delete "IF" and insert -- IP --, therefor.

In Column 3, Line 62, delete "DSMS" and insert -- DSMS 10 --, therefor.

In Column 5, Line 52, delete "DBMS" and insert -- DSMS --, therefor.

In Column 5, Line 53, delete "DBMS" and insert -- DSMS --, therefor.

In Column 6, Line 4, delete "DBMS" and insert -- DSMS --, therefor.

In Column 9, Line 10, delete "on" and insert -- on a --, therefor.

In Column 15, Line 1, delete "process)" and insert -- process) to --, therefor.

In Column 15, Line 32, delete "sill" and insert -- still --, therefor.

Claims

In Column 19, Line 57, in Claim 9, delete "calculator operable" and insert -- calculator --, therefor.

In Column 20, Line 9, in Claim 10, delete "being operable" and insert -- being --, therefor.

Signed and Sealed this  
Twenty-sixth Day of July, 2016

Michelle K. Lee  
*Director of the United States Patent and Trademark Office*